United States Patent [19]

Mark et al.

[11] 4,263,201

[45] Apr. 21, 1981

[54] FLAME RETARDANT POLYCARBONATE COMPOSITION

[75] Inventors: Victor Mark, Evansville, Ind.; Jimmy L. Webb, Ballston Lake, N.Y.; Joseph B. Williams, Mt. Vernon, Ind.

[73] Assignee: General Electric Company, Pittsfield, Mass.

[21] Appl. No.: 967,399

[22] Filed: Dec. 7, 1978

[51] Int. Cl.$^3$ .......................... C08K 5/03; C08K 5/09; C08K 5/36; C08L 71/04
[52] U.S. Cl. .......................... 260/45.7 S; 260/45.7 R; 260/45.7 ST; 260/45.75 J; 260/45.85 R; 260/45.85 H; 260/45.85 T; 260/45.95 R; 260/45.95 G; 260/45.95 N; 525/132; 525/133; 525/146; 525/147; 525/148; 525/150; 525/151; 525/152; 260/45.7 RT; 260/45.85 A; 260/45.85 N; 260/45.95 C; 260/45.95 J; 260/45.95 S
[58] Field of Search ...................... 260/45.7 R, 45.7 S, 260/45.7 RT, 45.95R, 45.95 G, 45.95 C, 45.95 N, 45.95 S, 45.95 J, 45.75, 45.85 R, 45.85 A, 45.85 H, 45.85 T, 45.85 N, 45.7 T; 525/68, 132, 133, 146, 147, 148, 150, 151, 152

[56] References Cited

U.S. PATENT DOCUMENTS

| | | | |
|---|---|---|---|
| 3,948,851 | 4/1976 | Mark | 260/45.8 RW |
| 4,110,299 | 8/1978 | Mark | 260/45.7 RL |

*Primary Examiner*—J. Ziegler
*Attorney, Agent, or Firm*—Morgan, Finnegan, Pine, Foley & Lee

[57] ABSTRACT

A flame retardant polycarbonate composition comprising in admixture an aromatic carbonate polymer and a minor amount of a mixture of a metal salt of an organic sulfonate or organic carboxylate, and an organic halogenated compound.

This invention relates generally to flame retardant polycarbonate compositions and more particularly to flame retardant compositions containing an aromatic carbonate polymer and a minor amount of a mixture of a metal salt of an organic sulfonate or organic carboxylate, and an organic halogenated compound.

35 Claims, No Drawings

FLAME RETARDANT POLYCARBONATE COMPOSITION

BACKGROUND OF THE INVENTION

With the increasing concern for safety, there is a positive move towards providing safe materials for public and household use. One particular area of need is that of providing flame resistant or flame retardant products for use by the ultimate consumer. As a result of this demand, many products are being required to meet certain flame retardant criteria both by local and federal government and the manufacturers of such products. One particular set of conditions employed as a measuring standard for flame retardancy is set forth in Underwriters' Laboratories, Inc. Bulletin 94. This Bulletin sets forth certain conditions by which materials are rated for self-extinguishing characteristics.

In the art, there are many known flame retardant additives which are employed by mixing with products to render such materials self-extinguishing or flame retardant. Such flame retardant additives have been known to be employed in amounts of 5 to 20 weight percent in order to be effective in extinguishing burning of those products which are combustible. It has also been found that such amounts can have a degrading effect upon the base product to be rendered flame retardant, resulting in the losses of valuable physical properties of the base product. This is particularly so when employing known flame retardant additives with the base product polycarbonate resins. Many of these known additives have a degrading effect upon the polymer.

DESCRIPTION OF THE INVENTION

It has now been surprisingly discovered that an aromatic polycarbonate can be made flame retardant by incorporating with the aromatic polycarbonate minor amounts of a mixture of certain additives, which additives are inert and do not degrade the aromatic polycarbonate. The mixture of particular additives employed herein is unique in that even very minor amounts render the aromatic polycarbonate flame retardant. The amount of the mixture of additives employed herein can vary, preferably, from 0.01 to about 5.0 weight percent based on the weight of the aromatic polycarbonate.

More specifically, the particular additives of this invention which comprise the mixture incorporated with the aromatic polycarbonate polymer are the metal salts of a monomeric or polymeric organic sulfonate or organic carboxylate and a monomeric or polymeric organic halogenated compound in which said metal salt is an alkali metal or alkaline earth metal salt or mixture thereof. The metals of these groups are sodium, lithium, potassium, rubidium, cesium, beryllium, magnesium, calcium, strontium and barium.

The metal salt of the monomeric organic sulfonate is of the formulae:

or

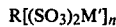

wherein n is an integer from 1 to 4, M is an alkali metal cation, M' is an alkaline earth metal cation and R is alkyl containing from 1 to 18 carbons or aryl containing from 6 to 10 carbon atoms, both of which can be optionally substituted with halogen (F, Cl, Br, I). When R is aryl, it can also be optionally substituted with nitro, alkyl containing from 1 to 18 carbons and another aryl containing from 6 to 10 carbons and combinations thereof.

It will be understood that the negative valency imparted by the sulfonate group is satisfied by the metal cation which can be mono or dispositive in valence. For instance, compounds as described above will have the electronegativity of the sulfonate group satisfied by the cation in two ways as illustrated hereinbelow:

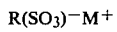

or

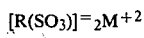

A particularly preferred monomeric organic sulfonate for purposes of this invention is one having the formula:

in which R is aryl containing from 6 to 10 carbons, as exemplified by the compounds sodium benzenesulfonate and potassium naphthalene-2-sulfonate.

The metal salt of the polymeric organic sulfonate is of the formulae:

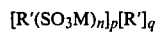

or

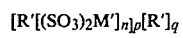

wherein n, M, M' are as previously defined, p+q is an integer from 2 to 2000, R' is a divalent aliphatic, araliphatic or aromatic radical which can be optionally substituted with halogen (F, Cl, Br, I) or mixtures thereof.

Particularly preferred polymeric organic sulfonates for purposes of this invention are poly potassium polystyrene polysulfonate, polysodium polytrifluoro ethylene sulfonate, and poly potassium poly(p-chloro styrene)polysulfonate.

In lieu of the monomeric organic sulfonate metal salt described above, this invention contemplates the use of a monomeric organic carboxylate metal salt of the formulae:

or

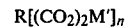

in which n is an integer of from 1 to 4, M is an alkali metal cation, M' is an alkaline earth metal cation, and R is alkyl containing from 1 to 18 carbon atoms or aryl containing from 6 to 10 carbon atoms, both of which can be optionally substituted with halogen (F, Cl. Br, I). When R is aryl, it can also be optionally substituted with nitro, alkyl containing from 1 to 18 carbons or aryl containing from 6 to 10 carbons or combinations thereof.

The aforedescribed monomeric or polymeric organic sulfonate metal salt or monomeric organic carboxylate metal salt is combined with an organic halogenated compound which is either a monomeric halogenated compound of the formula:

$$R''(X)_m$$

in which X is chlorine or bromine, m is an integer from 1 to the number of replaceable hydrogen atoms on the monomeric halogenated compound and R'' is an organo radical derived from aliphatic or cycloaliphatic hydrocarbons of from 6 to 20 carbons, aromatic hydrocarbon containing from 6 to 10 carbons, biphenyl, diphenyl ether, diphenylsulfone, diphenyl carbonate, bisphenols, 1,2-diphenoxyethane, Diels-Alder adducts of hexachloropentadiene and olefins, dienes, and other dienophiles, or is a halogenated oligomer or polymer derived from a polyolefin, polystyrene or from a bisphenol compound in form of polyesters or polycarbonates, said polymers being homopolymeric or copolymeric.

Regarding the monomeric halogenated compound, preferred examples include hexachlorodiphenylsulfone, dichlorodiphenylsulfone, tetrachlorodiphenylsulfone, decabromo-diphenyl-ether, 1,2-bis(pentabromophenoxy)ethane, and decabromo biphenyl ether, the latter illustrative of the case in which all the replaceable hydrogen atoms are substituted with bromo substituents. Other suitable examples which fall within this category of compounds include hexabromobenzene, decabromodiphenylcarbonate, decabromobiphenyl, tetrabromo bisphenol-A, tetrabromobisphenol-S and hexachlorocyclohexane.

Regarding the halogenated oligomer or polymer, they can be derived from a bisphenol compound, preferred illustrations being tetrachloro bisphenol-A copolycarbonate, dichloro bisphenol-A copolycarbonate, statistical mixtures of halogenated BPA polycarbonates, including chloro-bromo BPA polycarbonates, or from halogenated polyolefins such as poly(p-chlorostyrene), poly(dibromo styrene), polyvinyl chloride, and poly(-chloro-trifluoroethylene).

Halogenated bisphenols can be oxidatively coupled to provide chlorinated polyphenylene oxides. Methods for their preparation are known in the art and are described in numerous publications, for example, see Hay U.S. Pat. No. 3,306,874 and U.S. Pat. No. 3,306,875.

Chlorinated bisphenols are reacted with carbonate precursors to form copolymers according to prior art techniques. For example, tetrachloro bisphenol-A is reacted with carbonyl chloride to form tetrachloro-bisphenol-A copolycarbonate under conditions well documented in the prior art.

In general, the components which comprise the flame retardant mixture of this invention are prepared by methods disclosed in the prior art. In many instances, the materials are commercially available.

In the practice of this invention, any of the aromatic polycarbonates can be employed herein. These are homopolymers and copolymers and mixtures thereof that are prepared by reacting a dihydric phenol with a carbonate precursor. Typical of some of the dihydric phenols that may be employed in the practice of this invention are bisphenol-A, (2,2-bis(4-hydroxyphenyl)propane), bis(4-hydroxyphenyl)methane, 2,2-bis(4-hydroxy-3-methylphenyl)propane, 4,4-bis(4-hydroxyphenyl)heptane, 2,2-(3,3'-dichloro-4,4'-dihydroxydiphenyl) propane, 2,2-(3,5,3',5'-tetrabromo-4,4'-dihydroxydiphenyl) propane, (3,3'-dichloro-4,4'dihydroxyphenyl)methane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursors may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate di-(halophenyl) carbonates such as di-(chlorophenyl) carbonate, di-(bromophenyl) carbonate, di-(trichlorophenyl) carbonate, di-(tribromophenyl) carbonates, etc., di-(alkylphenyl) carbonates such as di(tolyl) carbonate, etc., di(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, BPA, 4,4'-biphenol, etc.) or glycols (bis-haloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers of this invention may be prepared by employing a molecular weight regulator, an acid acceptor and a catalyst. The molecular weight regulators which can be employed in carrying out the process of this invention include monohydric phenols such as phenol, chroman-I, paratertiarybutylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as for example, triethylamine, tripropylamine, N,N-dimethylaniline, quaternary ammonium compounds such as, for example, tetraethylammonium bromide, cetyl triethyl ammonium bromide, tetra-n-hyptylammonium iodide, tetra-n-propyl ammonium bromide, tetramethylammonium chloride, tetramethyl ammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also, included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polycarbonate and a branched polycarbonate.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

Optionally, the flame-retardant compositions disclosed herein may contain anti-dripping agents, such agents reducing the dripping problem usually found in flame-retardant compositions. Suitable examples include siloxanes, glass fibers, polytetrafluoroethylenes, high temperature elastomers, carbon fibers and other neutral fibers, glass spheres, etc.

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE I

One hundred (100) parts of an aromatic polycarbonate, prepared by reacting 2,2-bis(4-hydroxyphenyl) propane and phosgene in the presence of an acid acceptor and a molecular weight regulator and having an intrinsic viscosity of 0.57 is mixed with varying amounts of a finely ground dehydrated additive listed in Table 1 by tumbling the ingredients together in a laboratory tumbler. The resulting mixture is then fed to an extruder, which extruder is operated at about 265° C., and the extrudate is comminuted into pellets.

The pellets are then injection molded at about 315° C. into test bars of about 5 in. by ½ in. by about 1/16-⅛ in. thick into test squares of about 2 in. by 2 in. by about ⅛ in. thick. The test bars (5 for each additive listed in the Table) are subject to the test procedure set forth in Underwriters' Laboratories, Inc. Bulletin UL-94, Burning Test for Classifying Materials. In accordance with this test procedure, materials so investigated are rated either V-0, V-I or V-II based on the results of 5 specimens. The criteria for each V (for vertical) rating per UL-94 is briefly as follows:

"V-0": Average flame and/or glowing after removal of the igniting flame shall not exceed 5 seconds and none of the specimens shall drip flaming particles which ignite absorbent cotton.

"V-I": Average flaming and/or glowing after removal of the igniting flame shall not exceed 25 seconds and the glowing does not travel vertically for more than ⅛" of the specimen after flaming ceases and glowing is incapable of igniting absorbent cotton.

"V-II": Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the instant invention, as "burns". Further, UL-94 requires that all test bars in each test group must meet the V type rating to achieve the particular classification. Otherwise, the 5 bars receive the rating of the worst single bar. For example, if one bar is classified as V-II and the other four (4) are classified as V-0, then the rating for all 5 bars is V-II.

The result of an additive within the scope of the instant invention is as follows with a control being the aromatic polycarbonate as prepared above without the additive of the type set forth herein.

TABLE 1

Evaluation of Flame Retardant Compositions on Polycarbonate
(Intrinsic viscosity 0.57, ⅛" test specimen)

| Example No. | Additive A | Parts Per 100 (pph) | Additive B | pph | Flame out time in seconds | Drips per 5 bars | UL 94 Rating |
|---|---|---|---|---|---|---|---|
| 1 Control | — | — | — | — | 10.9 | 16 | V-II |
| 2 | Sodium benzene-sulfonate | 0.1 | — | — | 4.3 | 2 | V-II |
| 3 | — | — | DBDE[a] | 0.2 | 7.3 | 5 | V-II |
| 4 | Sodium benzene-sulfonate | 0.1 | DBDE | 0.2 | 2.8 | 0 | V-0 |
| 5 | Sodium naphthalene-2-sulfonate | 0.2 | — | — | 11.2 | 6 | V-II |
| 6 | Sodium naphthalene-2-sulfonate | .02 | CDS[b] | 0.4 | 3.6 | 0 | V-0 |
| 7 | Potassium diphenyl-sulfone-4-sulfonate | .05 | — | — | 8.8 | 4 | V-II |
| 8 | Potassium diphenyl-sulfone-4-sulfonate | .05 | DCDS[c] | 0.3 | 4.1 | 0 | V-0 |
| 9 | — | — | PBS[d] | 1.0 | 4.6 | 6 | V-II |
| 10 | Dipotassium diphenyl sul- | 0.1 | PBS | 1.0 | 3.9 | 0 | V-0 |

TABLE 1-continued

Evaluation of Flame Retardant Compositions on Polycarbonate
(Intrinsic viscosity 0.57, ⅛" test specimen)

| Example No. | Additive A | Parts Per 100 (pph) | Additive B | pph | Flame out time in seconds | Drips per 5 bars | UL 94 Rating |
|---|---|---|---|---|---|---|---|
| | fone-4,4'-di-sulfonate | | | | | | |

[a] decabromodiphenylether
[b] 2,4,4',5'-tetrachlorodiphenylsulfone
[c] 4,4'-dichlorodiphenylsulfone
[d] poly(4-bromostyrene)

EXAMPLE II

This Example repeats the procedure set forth in Example I except the aromatic polycarbonate has an intrinsic viscosity of 0.51 with the following results:

TABLE 2

Evaluation of Flame Retardant Compositions on Polycarbonate
(Intrinsic viscosity 0.51, ⅛" test specimen)

| Example No. | Additive A | Parts Per 100 (pph) | Additive B | pph | Flame out time in seconds | Drips per 5 bars | UL 94 Rating |
|---|---|---|---|---|---|---|---|
| 11 Control | — | — | — | — | 8.4 | 11 | V-II |
| 12 | Polysodium poly(styrene-4-sulfonate) | 0.1 | — | — | 6.6 | 3 | V-II |
| 13 | — | — | DBDE | 1.0 | 5.9 | 7 | V-II |
| 14 | Polysodium poly(styrene-4-sulfonate) | .1 | DBDE | 1.0 | 4.4 | 0 | V-0 |
| 15 | Calcium benzene sulfonate | .2 | — | — | 8 | 6 | V-II |
| 16 | — | — | PBS | 1.0 | 5.2 | 3 | V-II |
| 17 | Calcium benzene sulfonate | .2 | PBS | 1.0 | 3.8 | 0 | V-0 |

EXAMPLE III

This Example repeats the procedure set forth in Example I except that the aromatic polycarbonate has an intrinsic viscosity of 0.51 and the test specimen has a thickness of 1/16" with the following results:

TABLE 3

Evaluation of Flame Retardant Compositions on Polycarbonate
(Intrinsic viscosity 0.51, 1/16" test specimen)

| Example No. | Additive A | Parts Per 100 (pph) | Additive b | pph | Flame out time in seconds | Drips per 5 bars | UL 94 Rating |
|---|---|---|---|---|---|---|---|
| 18 Control | — | — | — | — | 6.3 | 16 | V-II |
| 19 | Sodium-2,4,5-trichloro benzene sulfonate | 0.2 | — | — | 3.5 | 1 | V-II |
| 20 | — | — | DBDE | 1.0 | 6.2 | 8 | V-II |
| 21 | Sodium-2,4,5-trichloro benzene sulfonate | 0.2 | DBDE | 0.4 | 3.4 | 0 | V-0 |
| 22 | Sodium-2,4,5-trichloro benzene sulfonate | 0.2 | hexachloro-diphenyl-sulfone | 0.4 | 4.6 | 0 | V-0 |
| 23 | Sodium-2,4,5-trichloro benzene sulfonate | 0.2 | PBS | 0.5 | 3.2 | 0 | V-0 |
| 24 | Polysodium-poly(4-chlorostyrene) sulfonate | 0.1 | — | — | 5.5 | 3 | V-II |
| 25 | Polysodium-poly(4-chlorostyrene) sulfonate | 0.1 | PBS | 0.5 | 3.1 | 0 | V-0 |

It should be understood by those skilled in the art that various modifications may be made in the present invention without departing from the spirit and scope thereof as described in the specification and defined in the appended claims.

What is claimed is:

1. A flame retardant aromatic carbonate polymer composition comprising in admixture an aromatic carbonate polymer and a minor amount of a mixture (1) a metal salt selected from the group consisting of a monomeric or polymeric organic sulfonate and an organic carboxylate; and (2) a monomeric or polymeric organic halogenated compound, wherein said metal salt is selected from the group consisting of the alkali metal salts, alkaline earth metal salts and mixtures thereof with the proviso that when said minor amount of a mixture contains a sulfonate, the halogenated compound is a monomeric halogenated compound of the formula:

$$R''(X)_m$$

wherein X is chlorine or bromine, m is an integer from 1 to the number of replaceable hydrogen atoms on the monomeric halogenated compound, and R'' is an organo radical derived from an aliphatic or cycloaliphatic hydrocarbon of from 6 to 20 carbons.

2. The composition of claim 1 wherein the composition comprises 0.01 to about 5.0 weight percent of the mixture based on the weight of the aromatic carbonate polymer composition.

3. The composition of claim 1 wherein the metal salt of the monomeric organic sulfonate has the formula:

$$R(SO_3M)_n$$

or $$R[(SO_3)_2M']_n$$

wherein n is an integer from 1 to 4; M is an alkali metal cation, M' is an alkaline earth metal cation, and R is alkyl containing from 1 to 18 carbons or aryl containing from 6 to 10 carbon atoms, both optionally substituted with halogen (F, Cl, Br, I), and when R is aryl, optionally substituted with nitro, alkyl containing from 1 to 18 carbons, another aryl or combinations thereof.

4. The composition of claim 3 wherein said metal salt of the monomeric organic sulfonate has the formula:

$$R(SO_3M)_n$$

wherein n is 1, M is as defined above and R is aryl containing from 6 to 10 carbons, optionally substituted with halogen.

5. The composition of claim 4 wherein the monomeric organic sulfonate metal salt is sodium benzenesulfonate.

6. The composition of claim 4 wherein the monomeric organic sulfonate metal salt is calcium benzenesulfonate.

7. The composition of claim 4 wherein the monomeric organic sulfonate metal salt is sodium-2,4,5-trichloro benzenesulfonate.

8. The composition of claim 4 wherein the monomeric organic sulfonate metal salt is sodium naphthalene-2-sulfonate.

9. The composition of claim 4 wherein the monomeric organic sulfonate metal salt is potassium diphenylsulfone-4-sulfonate.

10. The composition of claim 4 wherein the monomeric organic sulfonate metal salt is dipotassium diphenylsulfone-4,4'-disulfonate.

11. The composition of claim 1 wherein the metal salt of the polymeric organic sulfonate has the formula:

$$[R'(SO_3M)_n]_p [R']_q$$

or $$[R'[(SO_3)_2M']_n]_p [R']_q$$

wherein n, M and M' are as defined in claim 3, p+q is an integer from 2 to 2000, and R' is selected from the group consisting of divalent aliphatic, araliphatic or aromatic radical, halogen substituted R' of F, Cl, Br or I and mixtures thereof.

12. The composition of claim 11 wherein the polymeric organic sulfonate metal salt is polypotassium polystyrene polysulfonate.

13. The composition of claim 11 wherein the polymeric organic sulfonate metal salt is polysodium polytrifluoroethylene sulfonate.

14. The composition of claim 11 wherein the polymeric organic sulfonate metal salt is polysodium poly(p-chlorostyrene)sulfonate.

15. The composition of claim 1 wherein the metal salt of the monomeric organic carboxylate has the formula:

$$R(CO_2M)_n$$

or $$R[(CO_2)_2M']_n$$

wherein n, M, M' and R' are as defined in claim 13.

16. The composition of claim 1 wherein said organic halogenated compound is a monomeric halogenated compound of the formula:

$$R''(X)_m$$

wherein X is chlorine or bromine, m is an integer from 1 to the number of replaceable hydrogen atoms on the monomeric halogenated compound, and R'' is an organo radical selected from the group consisting of aliphatic or cycloaliphatic hydrocarbon of from 6 to 10 carbons, biphenyl, diphenyl ether, diphenylsulfone diphenyl carbonate, bisphenols, 1,2-diphenoxyethane and Diels-Alder adducts of hexachloropentadiene with olefins.

17. The composition of claim 16 wherein said monomeric halogenated compound is tetrachlorodiphenyl sulfone.

18. The composition of claim 16 wherein said monomeric halogenated compound is 4,4'-dichlorodiphenyl sulfone.

19. The composition of claim 16 wherein said halogenated compound is poly(4-bromostyrene).

20. The composition of claim 16 wherein said monomeric halogenated compound is 1,2-bis(pentabromophenoxy) ethane.

21. The composition of claim 16 wherein said monomeric halogenated compound is 2,4,4',5'-tetrachlorodiphenylsulfone.

22. The composition of claim 16 wherein said monomeric halogenated compound is decabromodiphenyl ether.

23. The composition of claim 14 wherein said monomeric halogenated compound is hexachlorodiphenylsulfone.

24. The composition of claim 1 wherein said organic halogenated compound is a polymer selected from the group consisting of polyolefin, polystyrene, and bisphenol polyester.

25. The composition of claim 24 wherein said halogenated compound is a halogenated polymer derived from a bisphenol compound.

26. The composition of claim 25 wherein said halogenated polymer is tetrachloro bisphenol-A copolycarbonate.

27. The composition of claim 24 wherein said halogenated compound is dichloro bisphenol-A copolycarbonate.

28. The composition of claim 24 wherein said halogenated compound is a halogenated polymer derived from polystyrene.

29. The composition of claim 28 wherein said halogenated polymer is poly(p-chlorostyrene).

30. The composition of claim 28 wherein said halogenated polymer is poly(dibromostyrene).

31. The composition of claim 24 wherein said halogenated compound is a halogenated polymer derived from a polyolefin.

32. The composition of claim 31 wherein said halogenated polymer is polyvinylchloride.

33. The composition of claim 31 wherein said halogenated polymer is poly(chlorotrifluoroethylene).

34. The composition of claim 1 wherein a drip inhibiting additive is included.

35. The composition of claim 34 wherein said additive is a polytetrafluoroethylene.

* * * * *